June 16, 1964  H. L. KATH, JR., ETAL  3,137,115
COTTON PICKER SPINDLE ASSEMBLY
Filed June 19, 1961
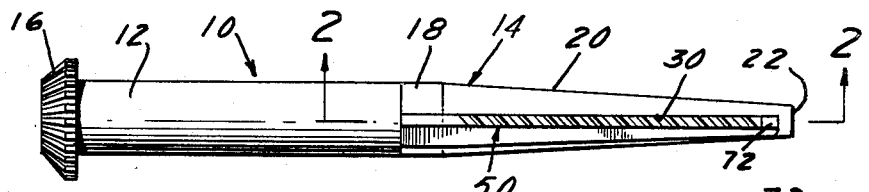
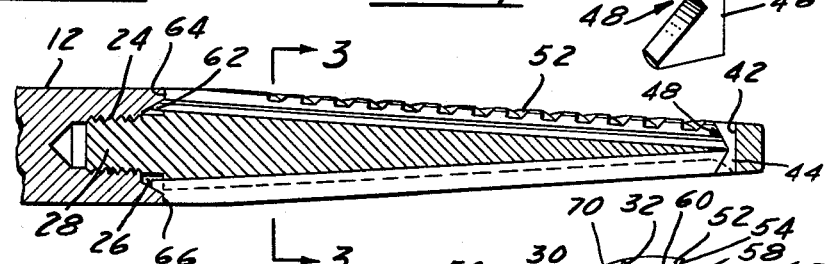
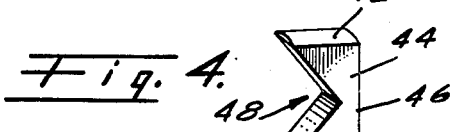
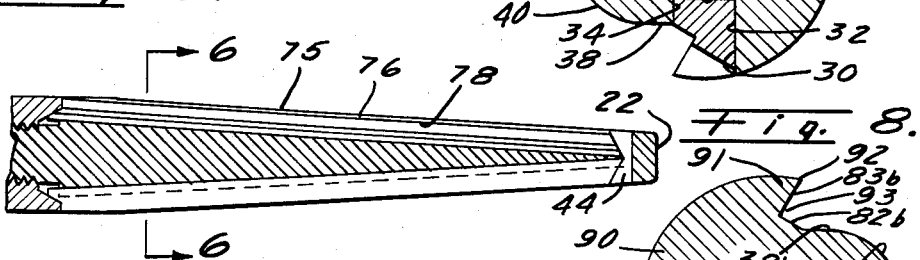
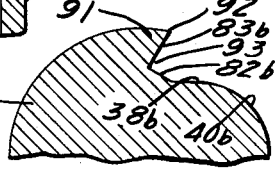
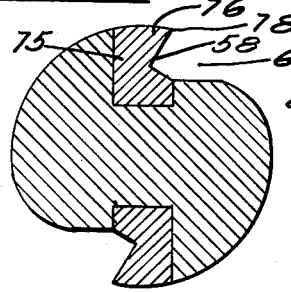
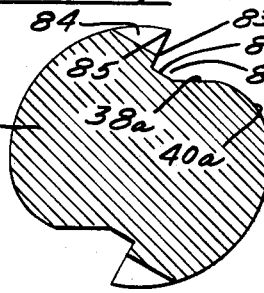
Henry L. Kath, Jr.,
Floyd M. Morris,
INVENTORS.
BY J. B. Baisch
Attorney United States Patent Office 3,137,115
Patented June 16, 1964

3,137,115
COTTON PICKER SPINDLE ASSEMBLY
Henry L. Kath, Jr., 301 Le Roy Ave., Arcadia, Calif., and Floyd M. Morris, 9851 La Decena Lane, Pico Rivera, Calif.
Filed June 19, 1961, Ser. No. 117,859
6 Claims. (Cl. 56—50)

This invention relates generally to cotton picker spindle assemblies and relates more particularly to cotton picker spindle assemblies arranged to engage and pick up cotton boles from plants in the field.

In the type of cotton picker machinery to which the present invention relates, the picking mechanism usually consists of a pair of picker drums which are so positioned that the cotton plants pass between the drums as the units move through the field, said drums being provided with a plurality of rotating spindles for engaging the cotton boles.

Usually the spindles have barbs or teeth that quickly become dulled and frequent sharpening of the barbs or teeth or replacement of the spindles is a necessary part of maintenance. Such maintenance has been found to be exceedingly expensive since the spindles have to be disassembled in the field and must be individually replaced.

This necessity for frequent replacement of mechanical picker spindles has been one of the major problems encountered with machines of this character. The spindles are of inherently high cost since they generally consist of machined parts which have to be completely discarded. The time involved in replacing the spindles also is a very important factor in the maintenance cost of the machine. Generally, the task of removing the spindle involves operations which are at least tantamount to a complete general overhauling of the unit.

It has been found that the gear end of the spindle has the life of 4 to 1 over the outer tapered end, and it is therefore an object of the present invention to provide a two-piece spindle having an outer tapered end portion that is removable for servicing or replacement, so that maximum use of the gear end is effected.

Another object of the invention is to provide a spindle of this character which may be disassembled and/or serviced in the field.

Still another object of the invention is to provide a spindle of this character that is more flexible and versatile with respect to the conical end portion which can be made of various materials in accordance with the particular use to which the spindles are put.

A further object of the invention is to provide a device of this character which may have teeth from zero ("0") to any desired number.

A still further object of the invention is to provide spindles of this character wherein the outer conical end portion, wherein the maximum picking function occurs, is replaceable.

Another object of the invention is to provide spindles of this character wherein there is a back angle or rake for the picking means (teeth, for example), so that the said picking means will remain sharp as said means wears.

Still another object of the invention is to provide teeth or barbs or collecting elements on the tapered end of the spindle which do not extend beyond the plane thereof; that is, said elements do not extend outwardly beyond the outside diameter of the particular part of the spindle where such elements are located.

A further object of the invention is to provide blades or teeth which are backed up or supported at the back side, thereby allowing minimum exposure to doffers or the like.

A still further object of the invention is to provide spindles of this character which are highly resistant to wear and, hence, have relatively long life.

Another object of the invention is to provide a spindle of this character wherein the outer conical portion is provided with longitudinally extending slots in which are disposed blades or blade members containing teeth or a picking edge, or the like.

Still another object of the invention is to provide a device of this character having a shaped retainer at one end of the spindle for holding the blades in operative position, and means at the spindle joint for holding the other ends of said blades.

A further object of the invention is to provide a spindle of this character that is relatively easy to manufacture.

It is a still further object of the invention to provide a spindle of this character having replaceable blades that may be quickly and easily replaced.

It is a further object of the invention to provide a practical, reliable and durable cotton picker spindle that will be exceedingly effective for the purpose for which it is intended.

The characteristics and advantages of the invention are further sufficiently referred to in connection with the following detailed description of the accompanying drawings, which represent certain embodiments. After considering these examples, skilled persons will understand that variations may be made without departing from the principles disclosed and I contemplate the employment of any structures, arrangements or modes of operation that are properly within the scope of the appended claims.

Referring to the drawings, which are for illustrative purposes only,

FIG. 1 is a side view of a cotton picker spindle embodying the present invention;
FIG. 2 is a sectional view taken on line 2—2 of FIG. 1;
FIG. 3 is a sectional view taken on lines 3—3 of FIG. 2;
FIG. 4 is a perspective view of the blade retainer;
FIG. 5 is a longitudinal sectional view of a portion of the cotton picker spindle showing an alternative type of blade;
FIG. 6 is a sectional view taken on line 6—6 of FIG. 5;
FIG. 7 is a similar sectional view of an alternative arrangement; and
FIG. 8 is a similar sectional view of another alternative arrangement.

Referring more particularly to FIGS. 1 through 4, there is shown a cotton picking spindle, indicated generally at 10, which embodies the present invention. The spindle comprises a gear portion 12 and a tapered blade portion, indicated generally at 14.

Portion 12 is the journal portion at the inner end and is provided at one end with a driving gear 16 which is engaged by a gear in the picker drum to provide rotational movement of the picker spindle during the operation of the operation of the cotton picker. There are, of course, a plurality of spindles which are driven in a well known manner by the cotton picker. The cotton picking machine generally is not shown, since it forms no part of the present invention.

Outer end portion or blade 14 of the spindle includes a cylindrical part 18 at the inner end thereof which is adjacent the outer end of the journal portion 12. Tapered portion 20 of the blade extends axially outwardly from the outer end of the cylindrical portion 18 and terminates in a blunt tip 22, said tapered portion 20 being generally frusto conical in character.

Journal portion 12 has a tapped bore extending axially inwardly from the outer end thereof and at the outer end of the tapped bore there is a countersunk frusto conical recess or chamber 26, the purpose of which will be described hereinafter.

Outer end portion or blade 14 is provided at its inner end with an axially extending externally threaded reduced diameter portion 28, which is threaded in to the tapped bore 24, the arrangement securing the parts 12 and 14 of the spindle together.

Spindle portion 14 is provided with a plurality of slots or grooves 30 which extend longitudinally from the inner end thereof. While any suitable number of slots may be provided, two are shown, and these are arranged diametrically relative to said spindle portions 14.

Each slot 30 is in the general shape of a U having a long side 32 and a short side 34, sides 30 and 32 being parallel to each other and spaced laterally apart. Connecting part of the U, indicated at 36, is normal to the sides 30 and 32. It is to be noted that the bottoms 36 of the opposed grooves are also parallel to each other at diametrically opposite sides of the axis of the spindle portion 14. Arms or sides 32 of the grooves extend to the periphery of the outer portion 14 while the shorter arms 34 terminate at the inner edge of a shoulder 38 which is normal to the arm or side 34 and which have an outer arcuate portion 40 which merges with the periphery of the spindle portion 14, as best shown in FIG. 3.

The outer ends of the grooves 30 join or run into a cross bore 42 adjacent the outer free end of the spindle portion 14, cross bore 42 being adapted to movably receive therein a key 44 having an outer end 46. The opposite end of retainer 44 is provided with a V-shaped notch 48 which faces away from the free end 22 of the spindle portion 14.

Removable blades, indicated generally at 50, are provided for each of the grooves. Each blade is provided with a plurality of longitudinally spaced teeth which have their free ends 54 disposed at the leading side of the blade, the direction of rotation of the spindle being indicated by the arrow 56.

The blade has a longitudinally extending notch 58 at its leading side, said notch being generally V-shaped in cross section, one side of the notch, indicated at 60, terminating at the plane of the periphery of the spindle portion 14, said notch providing an undercutting for the teeth.

The forward ends of the blades 30 are received in respective portions of the notch 48 of key 44, as best shown in FIG. 2, while the opposite ends of said blades are provided with extensions 62 which project into the recess 26 from the rear shoulder 64 of the blade. Shoulder 64 abuts against a peripheral shoulder 66 at the open end of recess 26 of journal portion 12 and when the reduced diameter portion 28 of spindle 14 is screwed into the tapped bore 24 the blades are securely held in position in the grooves 30, the forward ends of said blades being securely locked in position by the key 44. It is to be noted that no part of the blades extend outwardly of the cylindrical plane of the outer surface of the part 18 or the conical plane of the part 20. In other words, the blades are confined within the cylindrical plane of the part 18 and the conical plane of the part 20.

It is to be further noted that the free ends 54 of the teeth of the blades are free to pick up the cotton. Ample longitudinally extending spaces or recesses 68 of the spindle portion 14 and the undercutting at 58 leaves the leading ends 54 of the teeth with ample clearance for proper operation.

It has been found that cotton balling or "spindle twist" (jamming of cotton on the spindle) is prevented by provision of teeth which do not extend beyond the outside diameter of the respective parts of the spindle, where said teeth are located, and the outer surfaces of the teeth conform to the curvature of the spindle outside diameter where said teeth are located. This arrangement provides smooth surfaces for cotton removal and eliminates traps where cotton might cling.

Another advantage of the above described arrangement is that the teeth are backed up or supported by the part 70 of the spindle which extends longitudinally at the back side of the blades, there being a smooth curving surface on which the doffers ride for removal of cotton from the spindle with a wiping action. It is also to be noted that the outer ends 72 of the key 44 are flush with the plane of the outer surface of the adjacent portion of spindle portion 14, so as to maintain the smooth spindle surface to the very end or tip 22 of the spindle portion 14.

While the blades are shown as being metal, it is to be understood that other materials may be used for certain types of installation. For example, plastic may be used for some purposes, or elastomers.

While two blades are shown and described herein, it is to be understood that the number of blades may vary.

Also, it is to be noted that while the above described embodiment of the invention has a plurality of teeth, the arrangement shown in FIG. 5 comprises a blade 75 having a tooth 76 which extends the full length of the blade 75 except for the portions received in the notch 48 of the key 44 and the recess 26 of the journal portion 12. The tooth 76 is provided with a continuous leading edge 78 that is relatively sharp and is in the clear by reason of the recess 68 and the undercutting 58. The blade 75 is the same as the blade 30 except that the blade 75 does not have individual teeth cut therein. It is also to be noted that the construction of the spindle portion 14, shown in FIGS. 5 and 6, is the same as that shown in FIGS. 1 to 3.

Replacement of the blades is a simple matter. The spindle portion 14 is merely unscrewed from the spindle portion 12, the blades removed from the grooves 30 and new blades inserted therein, after which the spindle portion 14 is screwed back onto the spindle portion 12.

In FIG. 7 there is shown an alternative arrangement wherein there is a removable, tapered outer spindle portion formed with longitudinally extending grooves or recesses 81 at diametrically opposite sides of said spindle portion 80. The grooves 81 are defined by shoulder portions 38a and arcuate portions 40a corresponding to the shoulder portions 38 and arcuate portions 40 of the arrangement described hereinabove. Recesses 81 are also defined by a wall 82 which extends at an outward angle from the shoulder 81 and a wall portion 83 which extends from the outer end of the wall 82 to the periphery of the spindle portion 80. The recess thus formed provides an undercutting or rake for teeth 84 which are formed integrally of the spindle portion 80, the free ends 85 of the teeth being in the clear for picking or engaging the cotton by reason of the undercutting formed by the walls 82 and 83, which define a generally V-shaped part of the recess 81 at the leading ends of the teeth.

Referring to the arrangement shown in FIG. 8, there is a tapered spindle portion 90 which has a continuous tooth 91 similar to the continuous tooth 76 of the arrangement shown in FIGS. 5 and 6. The tooth 91 has a leading, relatively sharp edge 92 which is in the clear by reason of the undercutting at 93, there being a shoulder 38b and an arcuate portion 40b similar to the corresponding portions 38a and 40a of FIG. 7. The walls 82b and 83b correspond to the walls 82 and 83 of FIG. 7.

It is to be understood that the spindle portions 80 and 90 also have the reduced diameter externally threaded end portions 28 threadably received in the tapped openings 24 so that said spindle portions 80 and 90 may be removed from the spindle portions 12 when said spindle portions 80 and 90 become worn. New spindle portions 80 or 90 may then be screwed into the spindle portions 12.

Since the spindle portions 80 and 90 have integral teeth, it is unnecessary to provide them with cross bores adjacent the free ends thereof.

The teeth of the arrangements shown in FIGS. 7 and 8 not only have the undercutting of the previously described arrangements but said teeth do not extend beyond the plane of the peripheral conical surfaces of the spindle portions and said teeth are backed up by material at the trailing ends thereof.

The invention and many of its attendant advantages will be understood from the foregoing description, and it will be apparent that various changes may be made in the form, construction and arrangement of the parts of the invention without departing from the spirit and scope thereof or sacrificing its material advantages, the embodiments hereinbefore described being merely for purposes of illustration.

We claim:

1. A spindle for cotton picking, comprising: a cylindrical journal member having a gear at its inner end and a tapped bore extending inwardly from the outer end, there being a countersunk portion defining a chamber at the outer end of the tapped bore; an outer end member having a short cylindrical part at the inner end thereof and a frusto-conical portion tapering outwardly therefrom; an externally threaded reduced diameter portion extending axially from the inner end of the outer end member, said outer end member having a pair of oppositely arranged grooves, each generally U-shaped, in cross-section and having a relatively long arm and a relatively short arm in parallel relation and a bottom wall normal to said arms and connecting same together, the longer arm extending to the periphery of the outer end member, said outer end member having longitudinally extending relieved portion defined by a shoulder extending outwardly from the outer end of the shorter arm of the U, and normal thereto, and an arcuate part from the outer edge of the shoulder to the periphery of the conical part, said grooves terminating at a cross-bore adjacent the tip of the outer end member; a key disposed in said cross-bore and having a notch facing the longitudinally extending grooves; a blade removably disposed in each of said grooves, each blade having a longitudinally extending undercut at the leading side thereof, said blade being confined within the conical plane of the outer end member and having its outer surface substantially contiguous therewith, the trailing side of the blade being supported by the adjacent portion of the outer end member, the outer ends of said blades being received in respective parts of the notch in the key, whereby the outer ends of said blades are retained in position, the ends of the key being confined within the plane of the adjacent part of the outer end member; the inner end of each blade having a projection which extends into the chamber at the outer end of the journal member of the spindle, there being a shoulder at the inner end of each blade engaged by an annular end shoulder of said journal member extending about the outer end of said chamber.

2. A spindle for cotton picking, comprising: a journal member having a gear at its inner end, there being a chamber at the outer end of said member; an outer end member comprising a conical portion tapering outwardly from the inner end thereof; means providing a screw thread connection between said members, said outer end member of the spindle having a pair of oppositely arranged grooves, each generally U-shaped in cross-section and having a relatively high side wall and a relatively low side wall in parallel relation and a bottom wall normal to said sides, the higher side wall extending to the periphery of said end member; said end member being provided with a longitudinally extending relieved portion defined by a shoulder extending outwardly from the outer end of the low wall and normal thereto, and an arcuate part extending from the outer edge of the shoulder to the periphery of the outer end member, said grooves terminating at a cross-bore adjacent the tip of said outer end member; a key disposed in said cross-bore and having a notch facing longitudinally extending grooves; a blade removably disposed in each of said grooves, each blade having a longitudinally extending undercut at the leading side thereof, said blade having its outer surface substantially in the conical plane of the outer end member, the trailing side of the blade being supported by a portion of said end member; the outer ends of said blades being received in respective parts of the notch in the key, whereby the outer ends of said blades are retained in position, the ends of the key being confined within the plane of the adjacent part of said end member; the inner end of each blade having a projection which extends into the chamber at the outer end of the journal member and secured therein when the members are screwed together.

3. The invention defined by claim 2, wherein the blades have a plurality of teeth along the outer edge thereof, the points of said teeth extending forwardly over the undercut along the leading side.

4. The invention defined by claim 2, wherein each blade has a continuous leading outer edge.

5. In a rotatable spindle for picking cotton; a journal member; a tapered outer end member of generally conical shape, said outer end member having a longitudinally extending recess therein and a longitudinally extending blade receiving recess at the inner trailing side thereof; a blade received in said blade receiving recess, said blade having an outer leading edge facing the direction of rotation of the spindle and having an undercut longitudinally extending recess in the leading face thereof, said blade being confined within the conical plane of the outer end member; and means securing the blade in the blade receiving groove when the members of the spindle are connected together and releasing said blade when said members are disconnected.

6. The invention defined by claim 5, wherein the cotton picking edge of the blade is provided with a plurality of teeth.

References Cited in the file of this patent

UNITED STATES PATENTS

| | | |
|---|---|---|
| 2,497,777 | Baker et al. | Feb. 14, 1950 |
| 2,667,725 | Voigt | Feb. 2, 1954 |
| 2,667,726 | Vogel | Feb. 2, 1954 |
| 2,669,828 | Hutchins et al. | Feb. 23, 1954 |
| 2,823,509 | Lindsay | Feb. 18, 1958 |
| 2,953,889 | Lindsay | Sept. 27, 1960 |